United States Patent
Forbord et al.

[11] Patent Number: 5,999,375
[45] Date of Patent: Dec. 7, 1999

[54] POSITIONING INNER AND OUTER TRACKS ON A RECORDING DISC

[75] Inventors: Kent J. Forbord, St. Louis Park; Glenn A. Benson, Lakeville, both of Minn.

[73] Assignee: Seagate Technology, Inc., Scotts Valley, Calif.

[21] Appl. No.: 09/104,960

[22] Filed: Jun. 25, 1998

Related U.S. Application Data

[60] Provisional application No. 60/057,955, Jun. 5, 1997, and provisional application No. 60/063,322, Oct. 27, 1997.

[51] Int. Cl.$^6$ ........................................................ G11B 5/55
[52] U.S. Cl. ............................................................. 360/106
[58] Field of Search ..................................... 360/104–106

[56] References Cited

U.S. PATENT DOCUMENTS

| | | | |
|---|---|---|---|
| 5,477,401 | 12/1995 | Squires et al. | 360/75 |
| 5,590,001 | 12/1996 | Ino et al. | 360/97.02 |
| 5,602,700 | 2/1997 | Viskochil et al. | 360/105 |
| 5,675,455 | 10/1997 | Matsumoto | 360/106 |
| 5,712,750 | 1/1998 | Kim | 360/105 |
| 5,729,405 | 3/1998 | Isomura | 360/105 |
| 5,864,449 | 1/1999 | Dominguez, Jr. et al. | 360/105 |
| 5,905,606 | 5/1999 | Johnson et al. | 360/105 |

*Primary Examiner*—Allen T. Cao
*Attorney, Agent, or Firm*—Kinney & Lange

[57] ABSTRACT

An actuator assembly for a disc drive includes an E-block supported by a spindle for rotation about an axis and having an actuator arm supporting a transducer. An elongated yoke arm extends from the E-block. A motor rotates the E-block about the axis to position the transducer adjacent a selected track on the recording disc. The motor includes a voice coil supported by the yoke arm. A stop mechanism defines at least one of the inner and outer tracks of the disc and comprises at least one stop pin mounted to the disc drive housing and a stop surface on a distal end of the yoke arm for engaging the stop pin.

11 Claims, 3 Drawing Sheets

POSITIONING INNER AND OUTER TRACKS ON A RECORDING DISC

CROSS-REFERENCE TO RELATED APPLICATION(S)

This application claims priority from U.S. Provisional Application No. 60/057,955, filed Sep. 5, 1997 for "Ultra High Performance Disc Drive" by Kent J. Forbord and from U.S. Provisional Application No. 60/063,322, filed Oct. 27, 1997 for "Ultra High Performance Disc Drive" by Kent J. Forbord.

BACKGROUND OF THE INVENTION

This invention relates to magnetic disc drive assemblies of the class employing one or more rigid discs.

Magnetic disc drive assemblies employing rigid, or hard, discs are commonly used in desktop and other computer mainframes as a principal memory for the computer. There is a continuing need for disc drives with greater capacity. This need is met by a combination of factors, including increasing the number of tracks on a given disc. The number of tracks on a disc is established by the track density, usually measured by the number of tracks per radial inch, and the radial position of the inner and outer tracks. If the inner track is as close to the disc spindle as possible and the outer track is as close to the outer edge of the disc as possible, a maximum number of tracks for a given track density is achieved.

Present disc drives employ stop mechanisms that establish the limits of rotation of the head/actuator assembly, thereby defining stop positions of an E-block of the head/actuator assembly, thereby defining the inner and outer track positions on the disc(s). Typically, the stop mechanism employs one or more stop arms on the E-block arranged to engage one or more pins fixed to the disc drive housing. The position of the stop arm(s) to the stop pin(s) is established during manufacture of the disc drive housing, based on calculations dictated by the geometry of the actuator assembly.

In the prior art, the stop arms were mounted close to the spindle axis. Any error in the positioning of the stop surfaces (e.g., the pins and/or the engaging surfaces on the stop arm) was magnified over the longer distance between the spindle axis and the transducing heads. As a result, positioning of the inner and outer tracks was not altogether accurate.

BRIEF SUMMARY OF THE INVENTION

The present invention is directed to a stop mechanism that minimizes magnification of any error, thereby permitting more accurate location of the inner and outer tracks of the disc drive.

In one form of the invention, an actuator assembly for a disc drive includes an E-block supported by a spindle for rotation about an axis and having an actuator arm supporting a transducer. An elongated yoke arm extends from the E-block. A motor rotates the E-block about the axis to position the transducer adjacent a selected track on the recording disc. The motor includes a voice coil supported by the yoke arm. A stop mechanism defining at least one of the inner and outer tracks of the disc and comprises at least one stop pin mounted to the disc drive housing and a stop surface on a distal end of the yoke arm for engaging the stop pin.

In a preferred embodiment of this form of the invention, the stop surface is in a plane that projects through the axis so that it is in a plane normal to an arc of travel of the yoke arm as the E-block rotates about the axis.

Advantageously, the E-block includes a second elongated yoke arm with the voice coil of the motor being supported by both yoke arms. The stop mechanism includes two stop pins mounted to the disc drive housing and two stop surfaces on respective distal ends of the respective yoke arms for engaging the first and second pins, respectively. The inner track of the disc is defined by the position of the E-block when the first stop surface engages the first stop pin, and the outer track of the disc is defined by the position of the E-block when the second stop surface engages the second stop pin.

Another form of the invention is directed at establishing the positions of inner and outer tracks of a recording disc of a disc drive having a rotatable actuator assembly supporting a transducer adjacent selected tracks on the disc. The actuator assembly includes at least one extended yoke arm rotatable with the actuator assembly and the disc drive includes first and second stops fixedly mounted with respect to an axis of rotation of the actuator assembly. The positions of the inner and outer tracks are established by mounting the transducer to the actuator assembly. Thereafter, a distance between the axis of rotation of the actuator assembly and the transducer is identified. The position of the distal surface on the yoke arm is identified relative to the axis of rotation of the actuator assembly and to a projected line between the axis and the transducer. The distal surface of the yoke arm is milled a design amount to establish the position of one of the inner and outer tracks on the disc.

Advantageously, the E-block includes two yoke arms having stop surfaces, each milled a design amount to establish the positions of both the inner and outer tracks on the disc.

DETAILED DESCRIPTION OF THE PREFERRED EMBODIMENTS

Figure 1:
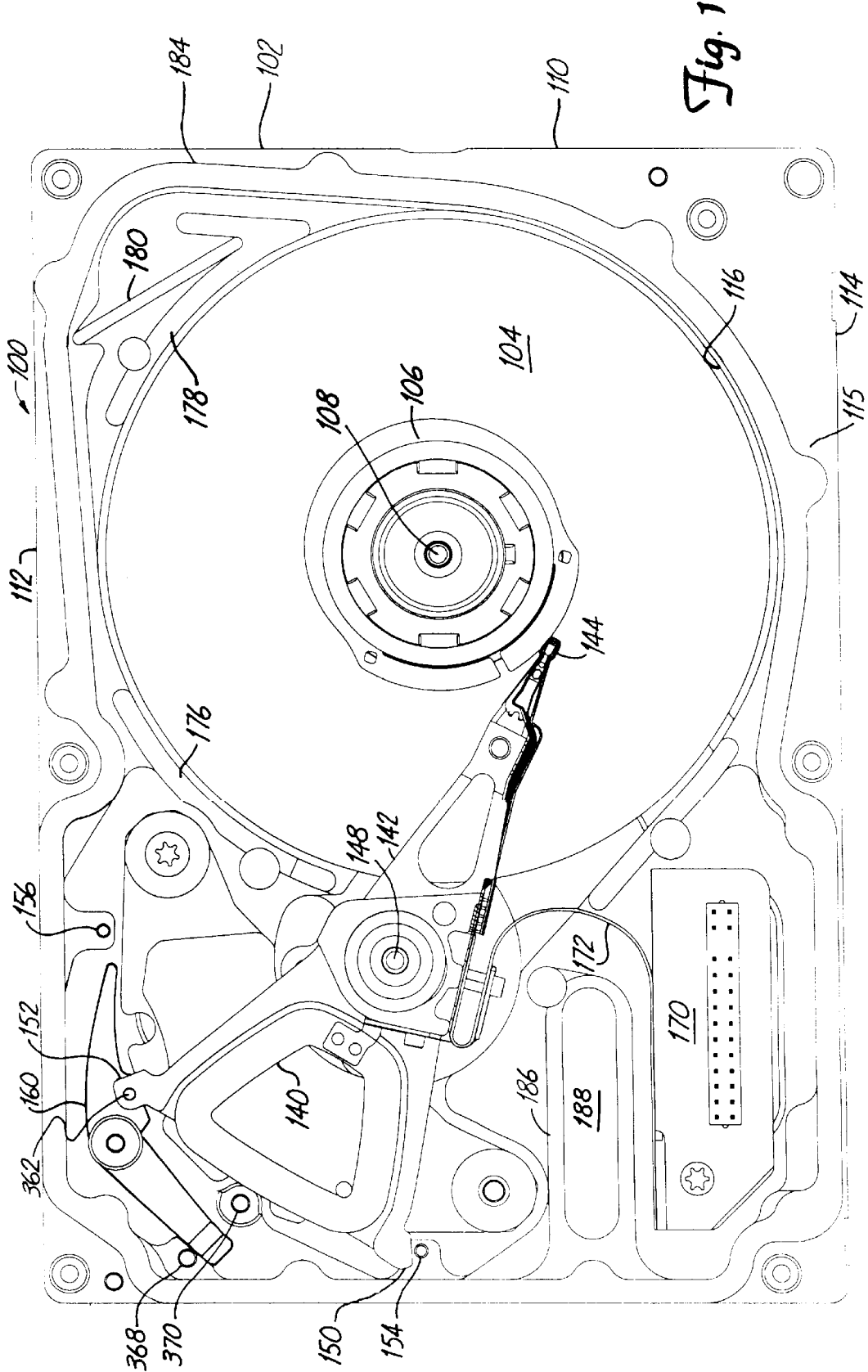
FIG. 1 is a top plan view of a magnetic disc drive, with the top cover removed, in accordance with the present invention.

FIG. 1 illustrates a top view of a disc drive 100 containing a head/actuator assembly in accordance with one embodiment of the present invention. Disc drive 100 includes a housing 102 containing a stack of discs 104 mounted to a disc spindle 106 centered on an axis 108. Typically, printed circuits (not shown) are formed in housing 102 on a bottom surface for connection to voice coil motor 140 for E-block 142, as well as data paths to circuit board 170. Circuit board 170 is connected via flex circuit 172 and conductors on E-block 142 to head 144 mounted to a slider and gimbal at the end of each load beam 146 at the end of the actuator arms of E-block 142. Flex circuit 172 also carries voice coil signals for motor 140.

Figure 2:
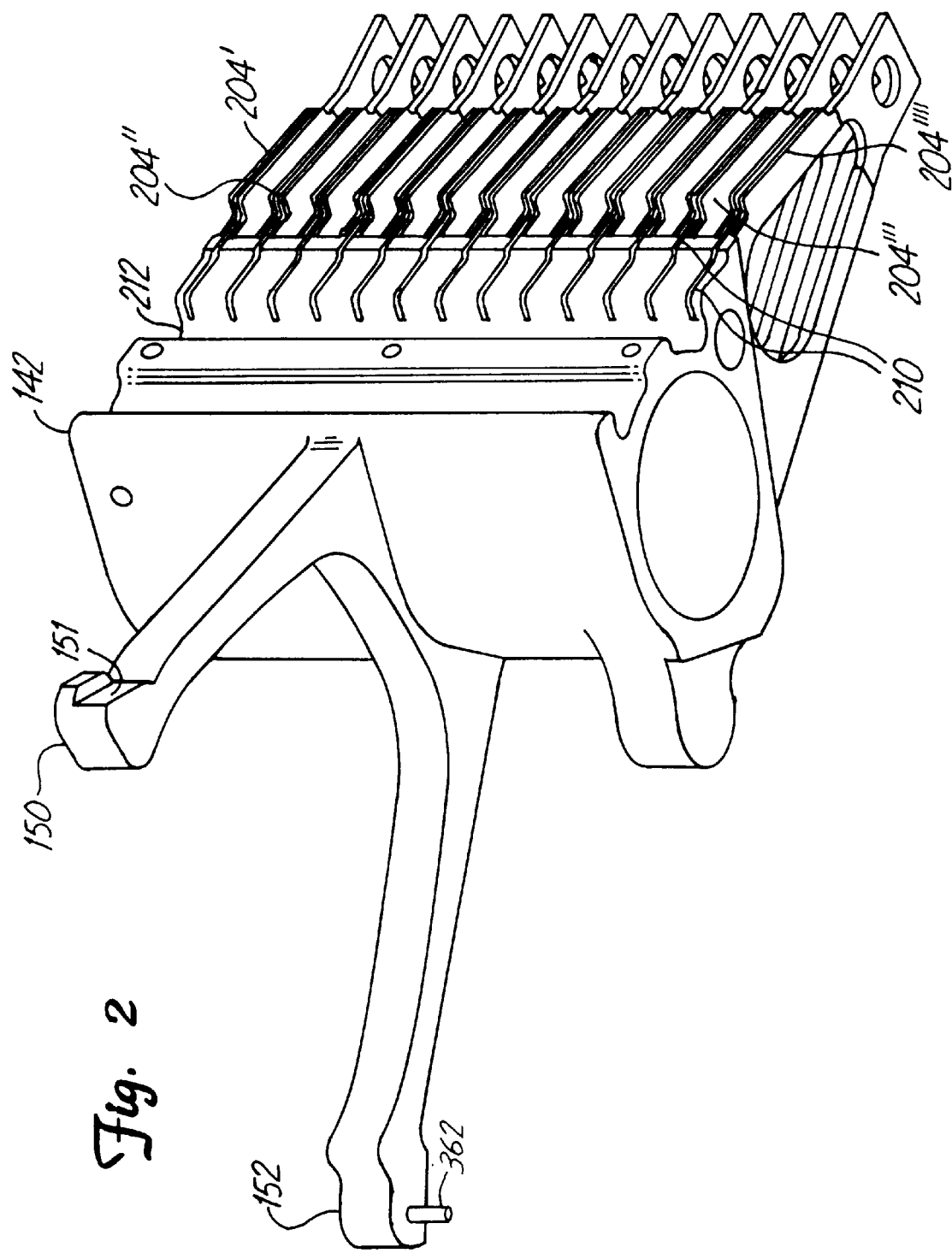
FIG. 2 is a perspective view of a portion of an actuator assembly of the disc drive illustrated in FIG. 1.
Figure 3:
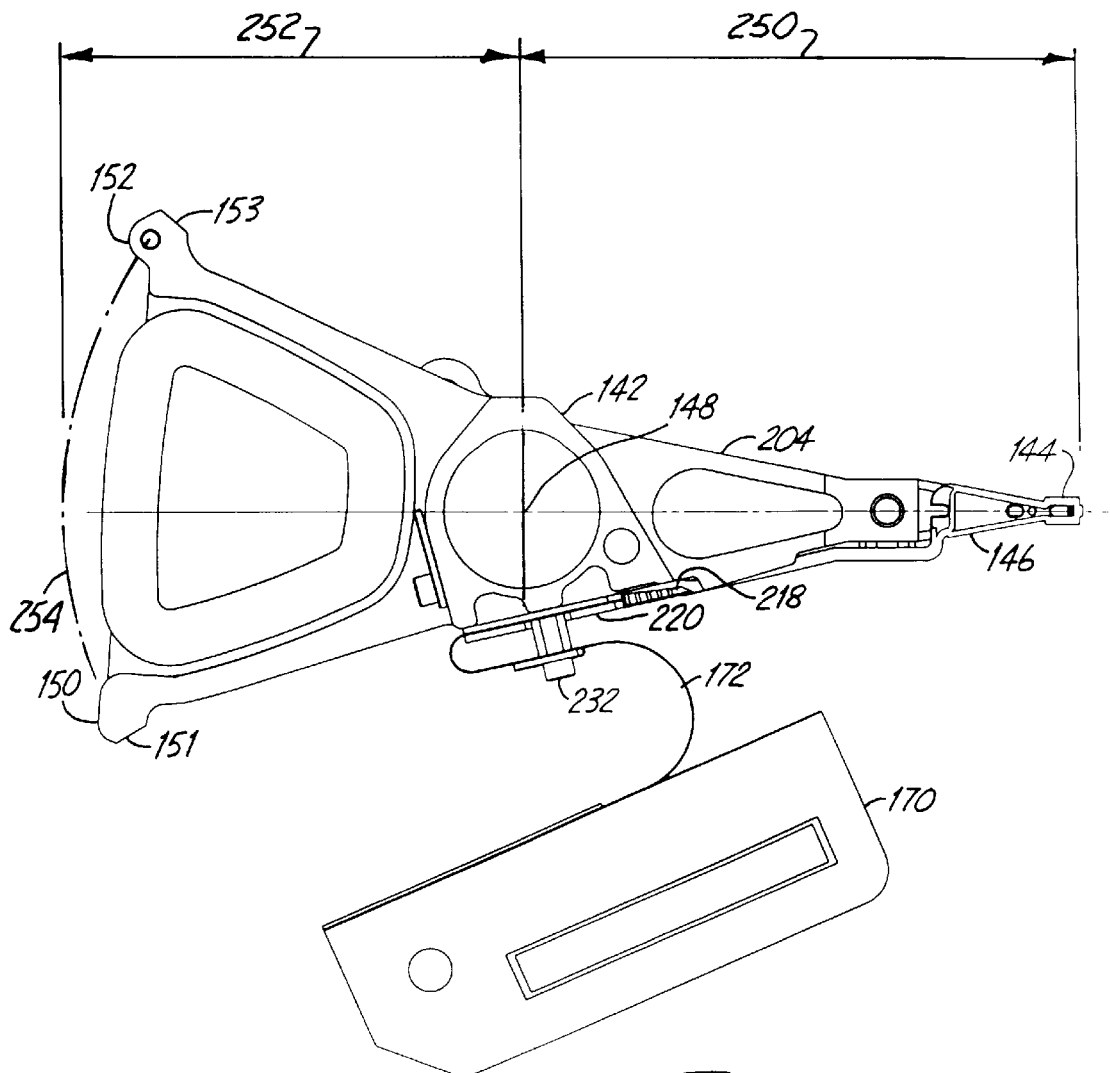
FIG. 3 is a top view of the actuator assembly illustrated in FIG. 2 with the conductors in place.

There is a separate load beam 146 and head/slider/gimbal 144 for each of the disc surfaces of discs 104. Load beams 146 are mounted to actuator arms of the E-block for rotation about axis 148 under the influence of voice coil motor 140. A pair of stop arms 150 and 152 are formed from the yoke of motor 140 to react against stop pins 154 and 156 mounted to housing 102 to define the limit of rotational travel of E-block 142, thereby defining the inner and outer track positions on discs 104. The engagement of stop arm 150 to stop pin 154 defines an inner stop position that limits the inner rotational travel of E-block 142 about the axis 148, thereby defining the inner track of the discs. The engagement of stop arm 152 to stop pin 156 defines an outer stop position that limits the outer rotational travel of E-block 142 about the axis 148, thereby defining the outer track of the discs. As shown particularly in FIGS. 2 and 3, stop arms 150 and 152 have flat surfaces 151 and 153, respectively to engage stop pins 154 or 156. In a typical 3½ inch disc drive, the radius of the inner track is 0.804 inches, and the radius of the outer track 1.800 inches, from spindle axis 108 of discs 104.

The present invention provides a method of positioning the inner and outer track positions for optimal disc capacity. As shown in FIG. 1, stop arms 150 and 152 engage a stop pin 154 or 156 to define the stop positions that limit of rotational travel of E-block 142. As shown particularly in FIGS. 2 and 3, stop arms 150 and 152 have flat surfaces 151 and 153, respectively to engage stop pins 154 or 156. One feature of the invention resides in the ability to accurately locate and position the inner and outer tracks of discs 104. More particularly, E-block 142 is placed in a shuttle (not shown). The gimbal/slider head assembly 146, 144 is swagged to the E-block and the position of the transducing gap or element of head 144 is located with respect to the shuttle and to axis 148 of the actuator assembly. The distance between axis 148 and transducer is represented by distance 250. The distance between the innermost and outermost data tracks being known (e.g., 19.8 mm in the present invention), the total angular displacement of the E-block can be geometrically identified. Likewise, the distance 252 between axis 148 and the arc 254 of movement of stop surfaces 151 and 153 is also known from the geometry of the E-block. Consequently, the positions of surfaces 151 and 153 may be milled or otherwise adjusted to accurately position the angular travel of head 144 in the full extent of movement of the E-block. The milling of surfaces 151 and 153 is performed in planes that project through axis 148 so that surfaces 151 and 153 are normal to the arc of travel of the yoke arm as the E-block rotates about the axis. Therefore, upon completion of the assembly of the E-block into the disc drive, the position of the inner and outer tracks is accurately determined.

One feature of the stop assembly resides in the fact that the stop surfaces are on the yoke arms of the motor assembly for the E-block, distal from the spindle axis and arranged to engage a stop pin 154, 156 mounted to the disc drive housing. In the prior art drive, stop pin on the E-block was mounted to an extension arm adjacent the flex circuit and near the spindle axis to engage a surface of the housing. Because of the proximity of the stop arrangement to the E-block, any error in positioning the stop surfaces was magnified along the greater distance (for example, 250) of the actuator arm to the head. More particularly, the distance between the spindle axis and transducer was typically three times the distance between the spindle axis and the stop surface, so any error in positioning the stop surface was magnified up to three times to the head. By positioning the stop surface at the distal end of the yoke as in the present invention, coupled with the shorter actuator arm of the E-block due to the smaller recording discs, the distance between the head 144 and the spindle axis 148 is nearly the same as the distance between axis 148 and stop surfaces 151 and 153. As a result, any error in the positioning of stop surfaces 151 and 153 is not magnified to the head as in the prior art.

Although the present invention has been described with reference to preferred embodiments, workers skilled in the art will recognize that changes may be made in form and detail without departing from the spirit and scope of the invention.

We claim:

1. An actuator assembly for a disc drive, the disc drive having a housing and supporting at least one rotatable recording disc, the actuator assembly comprising:
   a spindle supported in the disc drive housing;
   an E-block supported by the spindle for rotation about an axis, the E-block having an actuator arm supporting a transducer at a predetermined distance from the axis;
   an elongated yoke arm extending from the E-block;
   a motor for rotating the E-block about the axis so that the E-block positions the transducer adjacent a selected track on the recording disc, the motor including a voice coil supported by the yoke arm; and
   a stop mechanism defining at least one of the inner and outer tracks of the disc, the stop mechanism comprising
      at least one stop pin mounted to the disc drive housing, and
      a planar stop surface on a distal end of the yoke arm for engaging the stop pin, the stop surface being separated from the axis by approximately the same distance as the transducer is separated from the axis, a projection of the plane of the stop surface including the axis.

2. The actuator assembly of claim 1, wherein the stop surface is in a plane normal to an arc of travel of the yoke arm as the E-block rotates about the axis.

3. The actuator assembly of claim 1, including
   a second elongated yoke arm extending from the E-block, the voice coil of the motor being supported by the first-named yoke arm and the second yoke arm,
   the stop mechanism including first and second stop pins mounted to the disc drive housing and first and second planar stop surfaces on respective distal ends of the respective first and second yoke arms for engaging the first and second pins, respectively, a projection of the planes of the first and second stop surfaces including the axis the inner track of the disc being defined by the position of the E-block when the first stop surface engages the first stop pin and the outer track of the disc being defined by the position of the E-block when the second stop surface engages the second stop pin.

4. The actuator assembly of claim 3, wherein the first and second stop surfaces are in a plane normal to an arc of travel of the yoke arm as the E-block rotates about the axis.

5. A method of establishing positions of inner and outer tracks of a recording disc of a disc drive having a rotatable actuator assembly supporting a transducer adjacent selected tracks on the disc, wherein the actuator assembly includes at least one elongated yoke arm rotatable with the actuator assembly and the disc drive includes first and second stops fixedly mounted with respect to an axis of rotation of the actuator assembly, the method comprising:
   mounting the transducer to the actuator assembly;
   identifying a distance between the axis of rotation of the actuator assembly and the transducer;
   identifying a position of a distal planar stop surface on the yoke arm relative to the axis of rotation of the actuator assembly and a line projected between the axis and the transducer, a projection of the plane of the distal planar stop surface including the axis of rotation of the actuator assembly; and milling the distal surface of the yoke arm a design amount to establish the position of one of the inner and outer tracks on the disc.

6. The method of claim 5, wherein the stop surface is in a plane normal to an arc of travel of the yoke arm as the E-block rotates about the axis.

7. The method of claim 5 wherein the actuator assembly includes a second yoke arm, the method further including identifying a position of a second distal planar stop surface on the second yoke arm relative to the axis of rotation of the actuator assembly and the projected line between the axis and the transducer, a projection of the plane of the second distal planar stop surface including the axis of rotation of the actuator assembly; and milling the distal surface of the second yoke arm a design amount to establish the position of the other of the inner and outer tracks on the disc.

8. The method of claim 7, wherein the first and second stop surfaces are in a plane normal to an arc of travel of the yoke arm as the E-block rotates about the axis.

9. The method of claim 5 wherein the recording disc has a plurality of recording surfaces and the actuator assembly comprises an E-block supporting a plurality of transducers, such that one of the transducers confronts a respective one of the surfaces, all of the transducers being rotatable in unison with the actuator assembly to define cylinders of tracks on the plurality of recording surfaces, wherein the milling of the first and second distal surfaces establishes a position of inner and outer cylinders of the plurality of recording surfaces containing the respective inner and outer tracks for all of the disc surfaces.

10. The method of claim 5, wherein a distance between the stop surface and the axis of rotation is approximately equal to the distance between the transducer and the axis.

11. The method of claim 7, wherein a distance between the respective first and second stop surfaces and the axis of rotation is approximately equal to the distance between the transducer and the axis.

* * * * *